United States Patent [19]

Neuhaus

[11] Patent Number: 5,076,707

[45] Date of Patent: Dec. 31, 1991

[54] DEVICE FOR RADIATION TEMPERATURE MEASUREMENT OF MOLTEN MASSES IN A VACUUM

[75] Inventor: Dietmar Neuhaus, Duesseldorf, Fed. Rep. of Germany

[73] Assignee: Deutshe Forschungsanstalt fur Luft-und Raumfahrt e.V., Cologne, Fed. Rep. of Germany

[21] Appl. No.: 518,212

[22] Filed: May 3, 1990

[30] Foreign Application Priority Data

May 4, 1989 [DE] Fed. Rep. of Germany ....... 3914709

[51] Int. Cl.⁵ .............................. G01J 5/00; G01K 1/00
[52] U.S. Cl. ..................................... 374/130; 250/351; 374/139
[58] Field of Search ............... 374/121, 139, 129, 124, 374/125, 130; 250/351

[56] References Cited

U.S. PATENT DOCUMENTS

| | | | |
|---|---|---|---|
| 2,683,988 | 7/1954 | Machler et al. | 374/125 |
| 3,313,154 | 4/1967 | Bruce | 374/129 X |
| 4,337,396 | 6/1982 | Lauer et al. | 250/351 |
| 4,435,092 | 3/1984 | Iuchi | 374/124 X |
| 4,693,615 | 9/1987 | Kyriakis | 374/129 |
| 4,836,689 | 6/1989 | O'Brien | 374/125 |
| 4,842,674 | 6/1989 | Fretz et al. | 374/139 X |

OTHER PUBLICATIONS

Patent Abstracts of Japan, p. 377, Aug,. 2, 1985, vol. 9, No. 13, No. 60-57224, "Temperature Measuring Device by Radiation Thermometer", (1 page).

Primary Examiner—Daniel M. Yasich
Attorney, Agent, or Firm—Spensley, Horn Jubas & Lubitz

[57] ABSTRACT

Pyrometric temperature measurement of molten masses arranged in a vacuum involve the problem that the material of the molten mass deposits on mirrors, windows and other optical means so that the radiation, on its way to the pyrometer, is ever more absorbed. For preventing vapor depositions in the path of radiation, a matter filter having a rotating vane wheel is arranged between the container for the molten mass and the pyrometer. The radiation passes through the gaps between the vanes. Molecules of the molten material are caught by the vanes. Accordingly, a mirror behind the matter filter is kept free of undesired vaporization and transmits radiation to the pyrometer.

20 Claims, 3 Drawing Sheets

DEVICE FOR RADIATION TEMPERATURE MEASUREMENT OF MOLTEN MASSES IN A VACUUM

BACKGROUND OF THE INVENTION

1. Field of the Invention

The present invention is directed to a device for radiation temperature measurement of molten masses in a vacuum.

2. Description of Related Art

When molten samples, particularly metals, are subjected to temperature measurement in a vacuum, a problem occurs in that material of the sample, when being in a vaporous state, deposits on the wall of the vacuum chamber or on the window of the used pyrometer. Due to vaporization, the initially radiation-permeable member becomes impermeable to radiation after a short time and thus cannot be used for further pyrometric measurement.

A device for radiation temperature measurement of molten masses in a vacuum is known from Japanese laid-open patent application 60-57224, published Aug. 2, 1985. In this device, screen plates having tiny holes are mounted before the pyrometer, through which holes the radiation issuing from the molten mass can reach the pyrometer on a straightlined path. These screens have been provided to prevent vapor from penetrating to a window arranged before the pyrometer and from depositing thereon. Such a combination of screens cannot preclude the depositing of vapor on the observation window for a long time because a linear path for the evaporated particles is permanently open.

As known from German Patent 473 064 and U.S. Pat. No. 4,650,318, protection of lenses against deposition of particles can be obtained by generating gas streams before the lens for carrying these particles along. In vacuum chambers, however, such gas streams are undesired since they would impair the vacuum.

It is an object of the present invention to improve a device for radiation temperature measurement of molten masses in a vacuum in such a manner that vapor particles are more effectively kept off of the optical component or window arranged in the radiation path in the position nearest to the molten mass, so that the possible observation period is extended.

The device of the invention is also adapted for pyrometry of substances subliming in a vacuum. The device can be used for pyrometry of substances, no matter whether they are solid or fluid, which evaporate in a vacuum.

SUMMARY OF INVENTION

According to the present invention, a matter filter is provided with a rotating vane wheel positioned so that the path of rays passes axially parallel between its vanes. For a relatively short time, the rays have a clear path between two vanes of the rotating vane wheel. Only those vapor molecules which have their vector of movement directed in parallel to the path of rays and which are fast enough to not be seized by the vanes of the rotating vane wheel and absorbed can pass the gap between two vanes over the complete length of the vane wheel. The larger the length of the vane wheel the smaller is the probability that a vapor molecule can fly through the whole length of the channel defined by the vanes without being absorbed by the walls of this channel. The radial ends of the vanes of the vane wheel need not necessarily terminate freely; instead, the vanes can also enclose holes extending in parallel to the wheel axis and have their radial outer ends connected to each other. It is important that the path of rays extends unprohibited through a channel for a short part of the time of revolution of the vane wheel. Thus, the axial length of the vane wheel should preferably be as large as possible. Preferably, the axial length of the vane wheel is at least about 5 cm and more particularly about 10 cm.

For observation of molten metals at the melting point, the average velocity of the evaporating particles is in the range of 1000 meters per second. Deposition of vapor on the optical components of the pyrometer is effectively prevented when the matter filter retains all particles having a velocity smaller than five times the average velocity of the particles evaporating from the molten mass. Due to Boltzmann's speed-distribution of the evaporating particles, part of the particles can still overcome the filter, but this portion is negligible nonetheless. For particles incident parallel to the axis of rotation of the vane wheel and impinging on the vane wheel at the level of the screens, there is required, with a length of the vane wheel L-equal to 0.1 m a vane frequency of about $5 \times 10^4$ Hz. The vane frequency f is defined as $$f = \frac{V_U}{b},$$

wherein $V_U$ is the circumferential speed on the radius of the screen position and b is the channel width on the radius of the screen position. The vane frequency corresponds to the reciprocal opening time of the channel. A further category for characterizing the vane wheel is its light permeability, indicated by the percentage of the light reduction caused by the filter. The light permeability is determined by the width of the vanes at the level of the screens. Preferably, the light permeability is large, i.e. the vanes should preferably be as narrow as possible.

The matter filter allows passage of the radiation issuing from the molten mass to the pyrometer but provides a very large flow resistance for particles of matter, even those in a vaporized state. Thereby, it is accomplished that the vapor of the molten matter is retained at the matter filter, whereas the radiation is transmitted uninhibited on a linear path. The matter filter is not required to be permeable to radiation persistantly; instead, it is sufficient if permeability to radiation is given in certain time phases wherein measurement is performed. Behind the filter, radiation-guiding elements can cause no damage since only very few vapor molecules succeed in passing through the filter and reaching the area behind the filter.

Preferably, the individual vanes are very thin-walled so that the obtained light permeability parallel to the vane-wheel axis is as large as possible.

Preferably, selection elements, provided as screens and the like, are arranged before and behind the vane wheel for shielding the areas outside the path of rays.

The device of the invention is mountable in a vacuum container. It is particularly suitable that the vane wheel is connected to the rotor of a turbo molecular pump serving for maintaining the vacuum. In this case, no separate drive is necessitated for the vane wheel, and no additional shaft passages are required in the wall of the vacuum container.

The channels between the vanes of the vane wheel need not extend axially parallel to the axis of the vane wheel but may also be inclined with respect to the vane-wheel axis in case the path of rays to be filtered extends at an inclination to said axis. Also, it is not required that the vanes of the vane wheel present freely terminating ends. Instead, the vane wheel may consist of a cylinder having bores with an axial component, the vanes being formed by the interspaces between the bores.

BRIEF DESCRIPTION OF THE DRAWINGS

Embodiments of the invention will be explained in greater detail hereunder with reference to the drawings. In the drawings.

DESCRIPTION OF THE PREFERRED EMBODIMENTS

Figure 1:
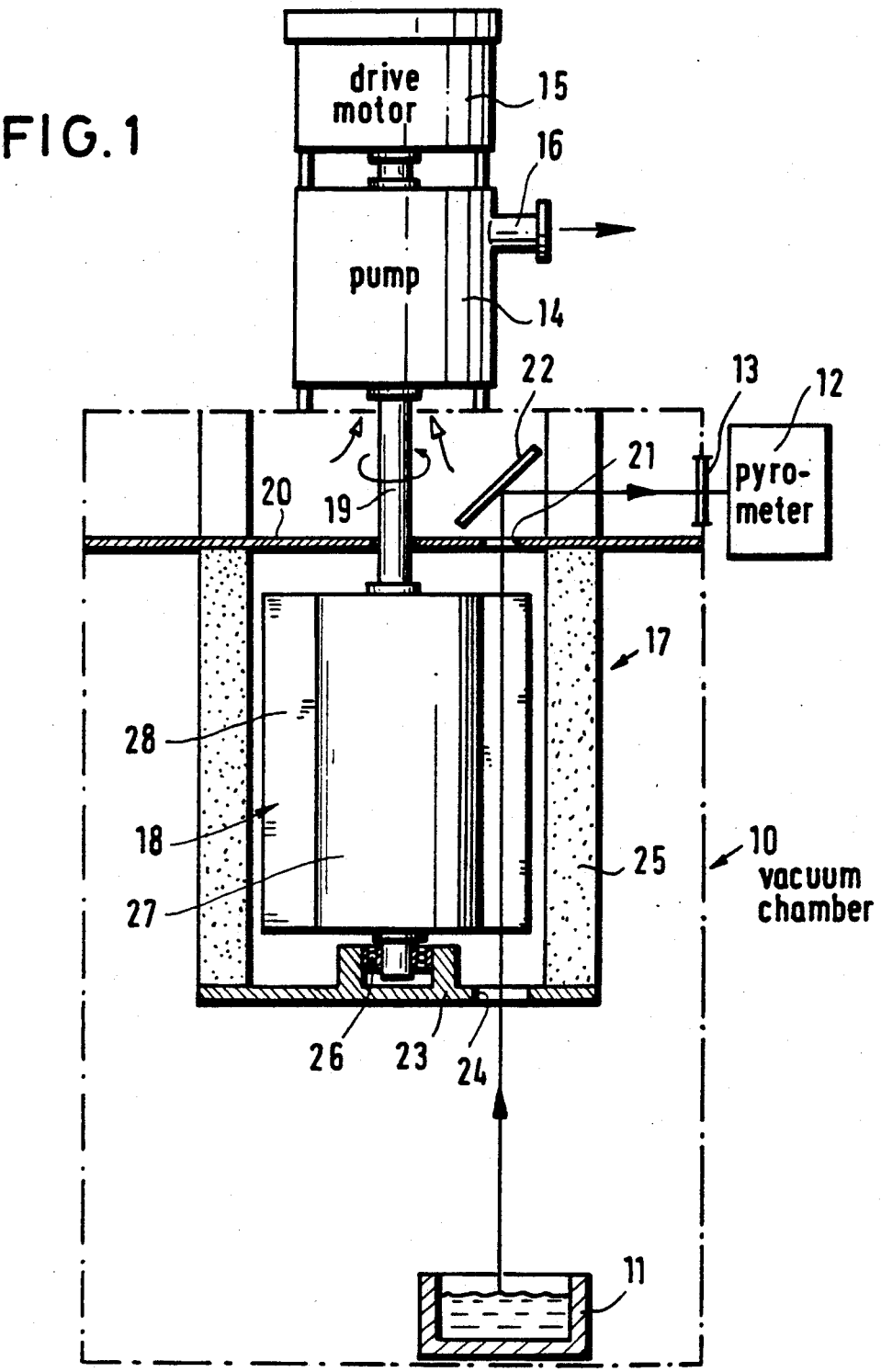
FIG. 1 is a schematic longitudinal section of a vacuum container having a matter filter and a pyrometer.

According to FIG. 1, the interior of a vacuum container 10 accomodates a pot 11 containing molten material. Outside the vacuum container 10, a pyrometer 12 is arranged for receiving, through a window 13, the radiation issuing from the molten mass and determining the temperature of the molten mass on the basis of the radiation.

A turbo molecular pump 14 is fastened to a wall of vacuum container 10 and contains a drive motor 15 for driving, at high speed, a rotor having turbine-like blades. The rotor communicates with the interior of the vacuum container 10 so that the molecular pump 14 sucks gas out of vacuum container 10 and conveys said gas to a backing pump via a connecting duct 16.

The matter filter 17 is arranged within the vacuum container 10. This matter filter is provided with a vane wheel 18 which, by a shaft 19, is connected to the rotor of the turbo molecular pump 14 and is driven at the rotational speed of the turbo molecular pump 14, being about 90,000 rpm. Shaft 19 leads through a partition wall 20 fixedly mounted in vacuum container 10 and arranged closely above vane wheel 18. Partition wall 20 has an aperture 21 formed therein which, in the path of rays, is arranged between the molten mass and the pyrometer 12. Behind aperture 21, an inclined mirror 22 is provided for reflecting the radiation through window 13 to pyrometer 12. The aperture 21 serves as a selection element. Also mirror 22 can be used as a selection element if it is sufficiently small for reflecting to pyrometer 12 only the radiation coming from the molten mass.

In the path of rays before vane wheel 18, a shielding wall 23 is provided, having an aperture 24 arranged in the path of rays. This shielding wall 23 constitutes the bottom wall of a shielding housing having a sheath surrounding the vane wheel 18 and having its top wall formed by partition wall 20. A bearing 26 for the lower end of the vane-wheel shaft is provided on shielding wall 23. The sheath 25 is fixedly arranged in vacuum container 10 and is preferably provided as a cooling jacket with a cooling agent flowing therethrough.

Figures 2, 3:
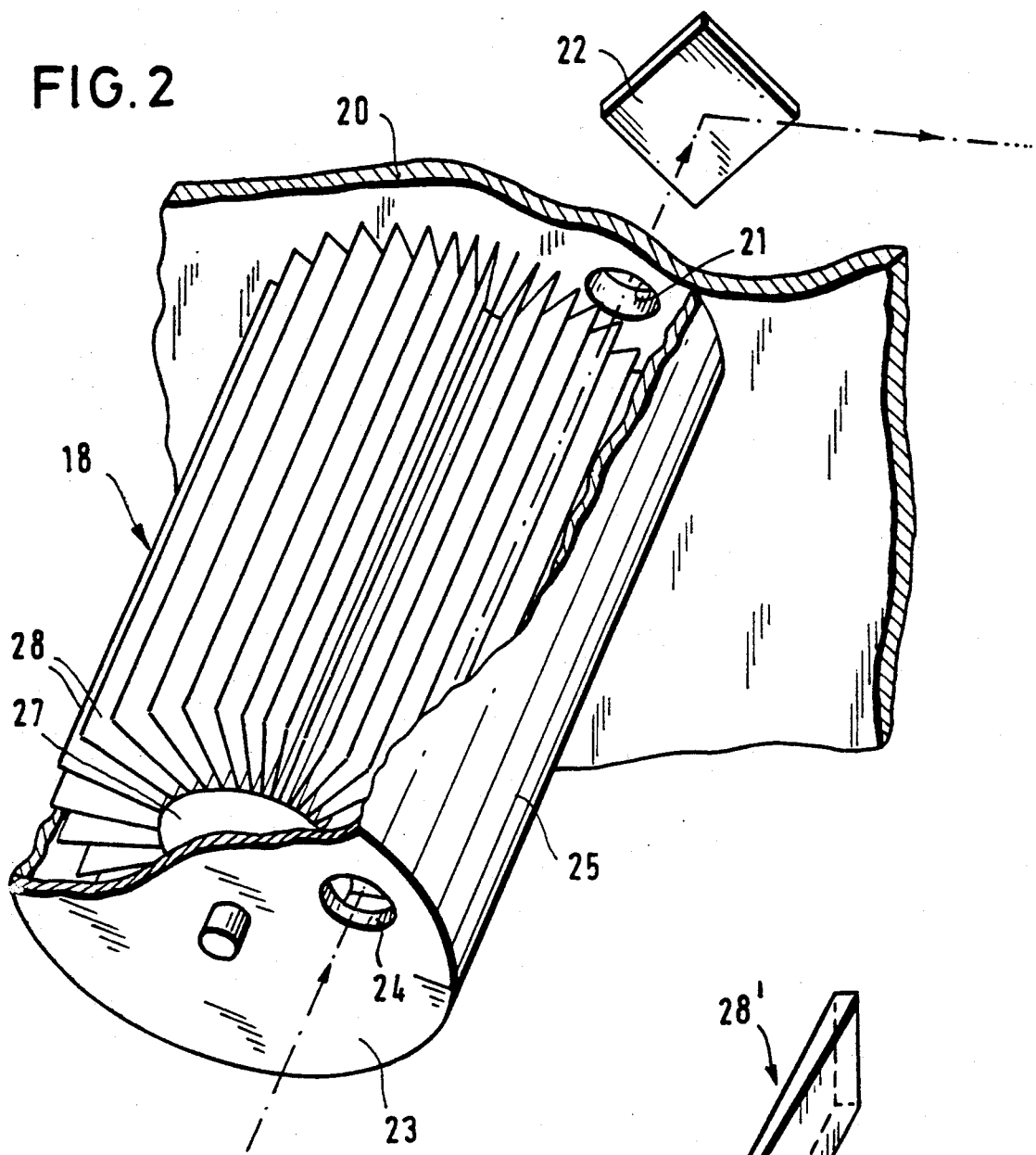
FIG. 2 is a perspective, partially broken representation of a matter filter.
FIG. 3 is a perspective representation of a preferred embodiment of a vane of a vane wheel.

As FIG. 2 shows, the vane wheel 18 is provided, at the circumference of a hub 27, with a plurality of radially projecting vanes 28 having sector-shaped interspaces therebetween. The vanes 28 are arranged parallel to the axis of hub 27 and extend linearly over a length of about 10 cm in axial direction. The number of vanes 28 is relatively large. In the preferred embodiment, this number is 180, so that the vanes 28 are arranged at mutual distances of two angular degrees about the circumference of the hub. A speed of the vane wheel of 90,000 rpm and a light permeability of 50% result in a vane frequency above 500 kHz. The likelihood that molecules pass through the vane wheel during the short time which is need—during rotation of the vane wheel—for an interspace between two adjacent vanes to cross the path of rays extending through apertures 24 and 21, depends on the vane frequency, the length of the vane wheel and on the average velocity of the molecules of the molten matter at the temperature. Vapor particles passing the aperture 24 are captured by the vanes 28 adhere thereto. Although very few molecules can still pass the aperture 21, these cannot cause a strong enough deposition on mirror 22 to compromise the mirror effect.

In order to prevent disturbing reflections at the vanes, the shape of the vanes is suitably as shown in FIG. 3, the width or strength of the vanes being enlarged with increasing distance from the molten mass. By the fact that the thickness of vanes 28 becomes larger in the direction of radiation, two adjacent vanes provide a radiation trap catching all of the radiation which has been reflected from the vane blade. In this manner, only the linear radiation through apertures 24 and 21 can pass through the matter filter 17.

By the cooling jacket 25, it is effected that the error in the pyrometric measurement, due to heat radiation from the matter filter 17, is as low as possible.

Figure 4:
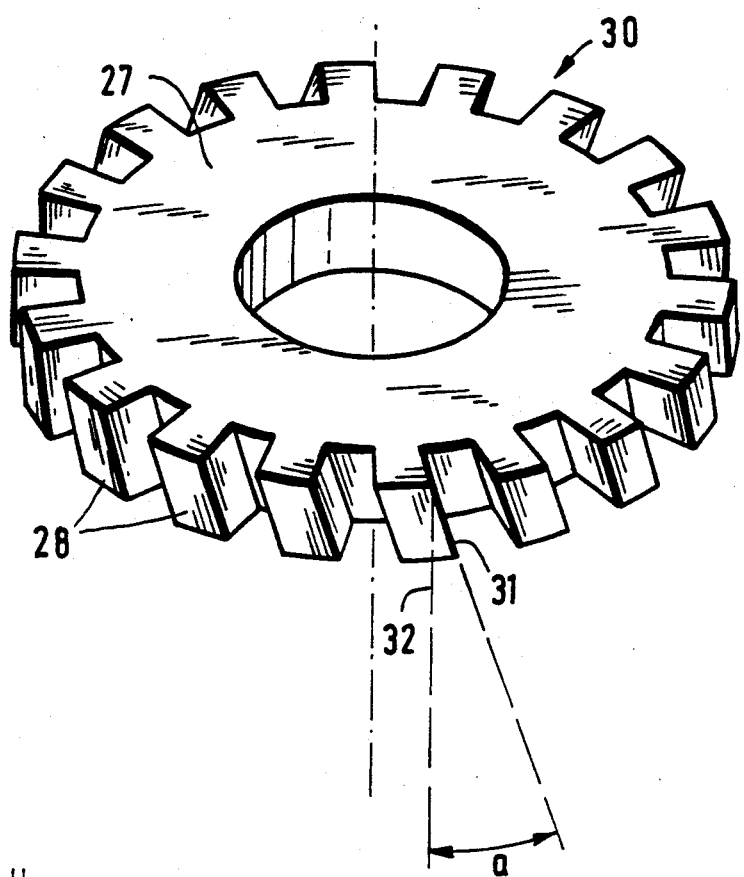
FIG. 4 shows a rotor disc of another embodiment of a vane wheel.

FIG. 4 shows a rotor disc 30 which is provided with a plurality of vanes 28 distributed on the circumference thereof and projecting from hub 27. Rotor disc 30 is a substantially cylindrical disc wherein the gaps between the vanes 28 are recessed on the circumference of the disc. The vanes 28 are oriented in the manner of a helical gearing. Reference letter a designates the angle which the tooth flank 31, by a line 32 parallel thereto, forms with the vane-wheel axis.

Figure 5:
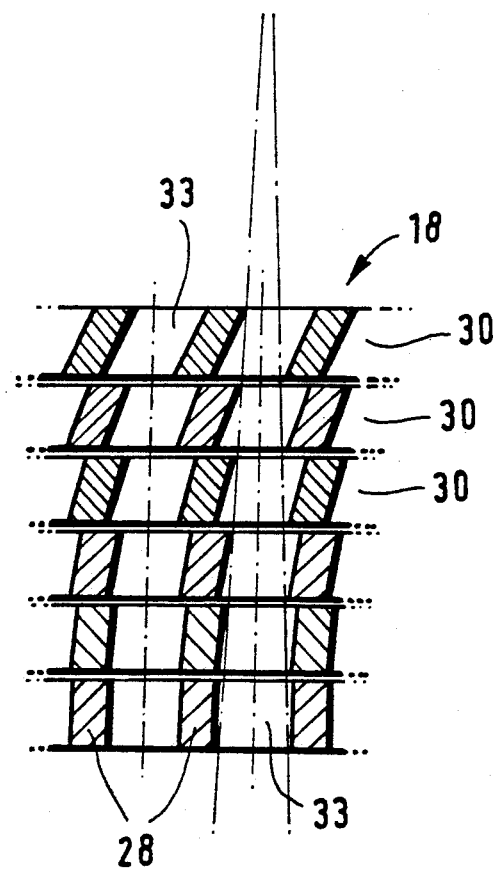
FIG. 5 is a partial side view of a vane wheel composed of a plurality of rotor discs of the type shown in FIG. 4.

For assembly of the vane wheel 18, a plurality of discs 30 of the type according to FIG. 4 are set in axial abutment against each other as shown in FIG. 5, all of the discs having the same number of vanes 28. The discs 30 are different from each other in that the angle a is zero at the (lowermost) disc 30 facing the molten mass and then increases with each disc. This succession of angles generates channels 33 extending in parallel to the wheel axis and extending in straight lines over the entire length of vane wheel 18, having their diameters narrowing with increasing distance from the molten mass and being provided with stepped side walls. The numerous steps in each channel 33 prohibit disturbing reflections; they act as radiation traps.

I claim:

1. A device for radiation temperature measurement of molten masses in a vacuum container, having
    a pyrometer arranged to receive radiation from the molten mass and
    a matter filter, arranged between the molten mass and the pyrometer, which transmits radiation but retains matter, characterized in that
the matter filter is provided with a rotating vane wheel having a plurality of vanes, the rotating vane wheel defining a rotational axis and being arranged so that the plurality of vanes is capable of intersecting a path of radiation from the molten mass to the pyrometer, the vanes being arranged to extend substantially radially outward from and substantially axially parallel to the rotational axis of the rotating vane wheel,
whereby the rotating vane wheel allows passage of radiation from the molten mass to the pyrometer and impedes passage of matter from the molten mass to the pyrometer.

2. The device according to claim 1 wherein the rotational speed of the vane wheel is such that the vane frequency is at least 100 kHz.

3. The device according to claim 1 wherein a shielding wall having an aperture is arranged before the vane wheel.

4. The device according to claim 1 wherein the matter filter comprises a shielding wall having an aperture and wherein, behind the vane wheel, a selection aperture is arranged in linear orientation relative to the molten mass and the aperture in the shielding wall.

5. A device for radiation temperature measurement of molten masses in a vaccum container, having
a pyrometer arranged in a path of radiation of the molten mass and
a matter filter, arranged between the molten mass and the pyrometer, which transmits radiation but retains matter,
characterized in that
the matter filter is provided with a rotating vane wheel having a plurality of vanes, the rotating vane wheel defining a rotational axis and being arranged so that the plurality of vanes is capable of intersecting a path of radiation from the molten mass to the pyrometer, the vanes being arranged to extend substantially radially outward from and substantially axially parallel to the rotational axis of the rotating vane wheel, and comprising a turbo molecular pump having a rotor, wherein the vane wheel is rotated by the rotor of the turbo molecular pump,
whereby the rotating vane wheel allows passage of radiation from the molten mass to the pyrometer and impedes passage of matter from the molten mass to the pyrometer.

6. A device for radiation temperature measurement of molten masses in a vacuum container, having
a pyrometer arranged in a path of radiation of the molten mass and
a matter filter, arranged between the molten mass and the pyrometer, which transmits radiation but retains matter,
characterized in that
the matter filter is provided with a rotating vane wheel having a plurality of vanes, the rotating vane wheel defining a rotational axis and being arranged so that the plurality of vanes is capable of intersecting a path of radiation from the molten mass to the pyrometer, wherein the vanes are arranged to extend radially outward from and axially parallel to the rotational axis of the rotating vane wheel,
whereby the rotating vane wheel allows passage of radiation from the molten mass to the pyrometer and impedes passage of matter from the molten mass to the pyrometer.

7. A device for radiation temperature measurement of molten masses in a vacuum container, having
a pyrometer arranged in a path of radiation of the molten mass and
a matter filter, arranged between the molten mass and the pyrometer, which transmits radiation but retains matter,
characterized in that
the matter filter is provided with a rotating vane wheel having a plurality of vanes, the rotating vane wheel defining a rotational axis and being arranged so that the plurality of vanes is capable of intersecting a path of radiation from the molten mass to the pyrometer, the vanes being arranged to extend substantially radially outward from and substantially axially parallel to the rotational axis of the rotating vane wheel, wherein the width of the vanes is enlarged with increasing distance from the molten mass in such a manner that adjacent vanes provide a radiation trap for radiation reflected from the vanes,
whereby the rotating vane wheel allows passage of radiation from the molten mass to the pyrometer and impedes passage of matter from the molten mass to the pyrometer.

8. A device for radiation temperature measurement of molten masses in a vacuum container, having
a pyrometer arranged in a path of radiation of the molten mass and
a matter filter, arranged between the molten mass and the pyrometer, which transmits radiation but retains matter,
characterized in that
the matter filter is provided with a rotating vane wheel having a plurality of vanes, the rotating vane wheel defining a rotational axis and being arranged so that the plurality of vanes is capable of intersecting a path of radiation from the molten mass to the pyrometer, wherein the vane wheel consists of a plurality of rotor discs set in axial abutment against each other and having their vanes arranged such that linear channels, being in parallel to the axis of the vane wheel and extending over the entire length thereof, are provided between the vanes,
whereby the rotating vane wheel allows passage of radiation from the molten mass to the pyrometer and impedes passage of matter from the molten mass to the pyrometer.

9. The device according to claim 8 wherein the vanes of at least some of the rotor discs are inclined in a manner of a helical gearing.

10. The device according to claim 9 wherein the inclination of the vanes of the rotor discs becomes larger with increasing distance from the molten mass.

11. A device for radiation temperature measurement of a radiation generating molten mass in a vacuum container, comprising:
a pyrometer arranged to receive radiation from the molten mass, and
a radiation transmitting, matter retaining filter, the filter including a rotatable vane wheel having a plurality of vanes, the rotatable vane wheel defining a rotational axis and being arranged so that the plurality of vanes is capable of intersecting a path of radiation from the molten mass to the pyrometer, the vanes being arranged to extend substantially radially outward from and substantially axially parallel to the rotational axis of the rotating vane wheel, whereby the rotatable vane wheel allows passage of radiation from the molten mass to the pyrometer and impedes passage of matter from the molten mass to the pyrometer.

12. The device according to claim 11 comprising means for rotating the vane wheel at a frequency of at least 100 kHz.

13. The device according to claim 11, comprising:
a shielding wall having an aperture therein arranged between the molten mass and the vane wheel in the path of radiation from the molten mass to the pyrometer.

14. The device according to claim 13, comprising:
a selection element arranged in the path of radiation from the molten mass to the pyrometer and in substantially linear alignment with the molten mass and the aperture.

15. A device for radiation temperature measurement of a radiation generating molten mass in a vacuum container, comprising:
a pyrometer arranged to receive radiation from the molten mass, and
a radiation transmitting, matter retaining filter, the filter including a rotatable vane wheel having a plurality of vanes, the rotatable vane wheel defining a rotational axis and being arranged so that the plurality of vanes is capable of intersecting a path of radiation from the molten mass to the pyrometer, comprising a turbo molecular pump having a rotor for rotating the vane wheel, the vanes being arranged to extend substantially radially outward from and substantially axially parallel to the rotational axis of the rotating vane wheel,
whereby the rotatable vane wheel allows passage of radiation from the molten mass to the pyrometer and impedes passage of matter from the molten mass to the pyrometer.

16. A device for radiation temperature measurement of a radiation generating molten mass in a vacuum container, comprising:
a pyrometer arranged to receive radiation from the molten mass, and
a radiation transmitting, matter retaining filter, the filter including a rotatable vane wheel having a plurality of vanes, the rotatable vane wheel defining a rotational axis and being arranged so that the plurality of vanes is capable of intersecting a path of radiation from the molten mass to the pyrometer, wherein each of the plurality of vanes defines a width which enlarges with increasing distance from the molten mass, whereby a radiation trap is provided for radiation reflected from the vanes, the vanes being arranged to extend substantially radially outward from and substantially axially parallel to the rotational axis of the rotating vane wheel,
whereby the rotatable vane wheel allows passage of radiation from the molten mass to the pyrometer and impedes passage of matter from the molten mass to the pyrometer.

17. A device for radiation temperature measurement of a radiation generating molten mass in a vacuum container, comprising:
a pyrometer arranged to receive radiation from the molten mass, and
a radiation transmitting, matter retaining filter, the filter including a rotatable vane wheel having a plurality of vanes, the rotatable vane wheel defining a rotational axis and being arranged so that the plurality of vanes is capable of intersecting a path of radiation from the molten mass to the pyrometer, wherein the vane wheel defines an axis and comprises a plurality of rotor discs arranged in axial abutment, each of the plurality of rotor discs defining a plurality of vanes, the plurality of vanes defining linear channels substantially parallel to the axis of the vane wheel and extending over the length of the vane wheel,
whereby the rotatable vane wheel allows passage of radiation from the molten mass to the pyrometer and impedes passage of matter from the molten mass to the pyrometer.

18. The device according to claim 17 wherein the vanes of at least some of the plurality of rotor discs are inclined.

19. The device according to claim 18 wherein the inclination of the vanes of the rotor discs increases with increasing distance from the molten mass.

20. A device for radiation temperature measurement of a radiation generating molten mass in a vacuum container, comprising:
a pyrometer arranged to receive radiation from the molten mass, and
a radiation transmitting, matter retaining filter, the filter including a rotatable vane wheel having a plurality of vanes, the rotatable vane wheel defining a rotational axis and being arranged so that the plurality of vanes is capable of intersecting a path of radiation from the molten mass to the pyrometer,
wherein the plurality of vanes are radially arranged and axially parallel to the rotational axis of the rotating vane wheel,
whereby the rotatable vane wheel allows passage of radiation from the molten mass to the pyrometer and impedes passage of matter from the molten mass to the pyrometer.

* * * * *